Figure 1:
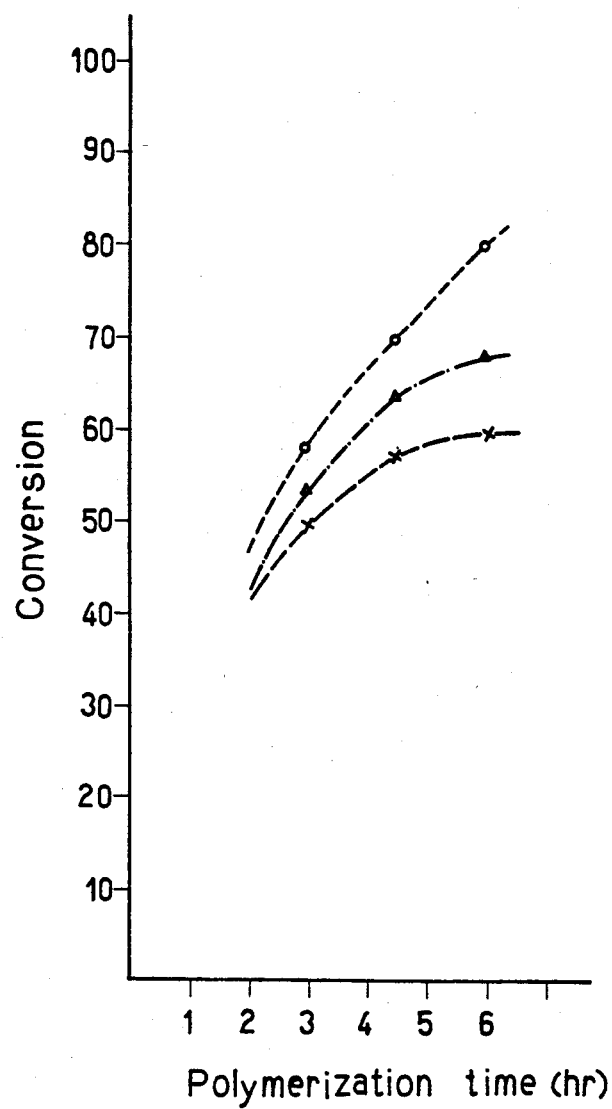

United States Patent [19]

Toshine et al.

[11] Patent Number: 4,579,922

[45] Date of Patent: Apr. 1, 1986

[54] EMULSIFIER FOR EMULSION POLYMERIZATION

[75] Inventors: Tatsumi Toshine, Yawata; Kimio Kawatani, Suita, both of Japan

[73] Assignee: Arakawa Kagaku Kogyo Kabushiki Kaisha, Osaka, Japan

[21] Appl. No.: 734,482

[22] Filed: May 16, 1985

Related U.S. Application Data

[60] Continuation of Ser. No. 519,596, Aug. 2, 1983, abandoned, which is a division of Ser. No. 330,847, Dec. 15, 1981, abandoned.

[51] Int. Cl.$^4$ ................................................. C08F 2/22
[52] U.S. Cl. .................................... 526/204; 526/215; 526/216
[58] Field of Search .................... 526/204, 215, 216

[56] References Cited

U.S. PATENT DOCUMENTS

| | | | |
|---|---|---|---|
| 3,039,861 | 6/1982 | Andress et al. | 44/71 |
| 3,578,679 | 5/1971 | Caruso et al. | 260/501.11 |
| 3,857,879 | 12/1974 | Abramitis | 260/501.11 |
| 3,920,731 | 11/1975 | Naik | 260/485.11 |
| 4,064,092 | 12/1977 | Burroway et al. | 524/320 |
| 4,215,162 | 7/1980 | Kunnen et al. | 524/300 |

*Primary Examiner*—Joseph L. Schofer
*Assistant Examiner*—Bernard Lipman
*Attorney, Agent, or Firm*—Buell, Ziesenheim, Beck & Alstadt

[57] ABSTRACT

An emulsifier for emulsion polymerization containing as its active component a half amide alkali salt and/or a half ester alkali salt of a succinic acid having a hydrocarbon substituent with 8 to 30 carbon atoms.

8 Claims, 1 Drawing Figure

EMULSIFIER FOR EMULSION POLYMERIZATION

This application is a continuation of our copending application Ser. No. 519,596, filed Aug. 2, 1983, now abandoned, which was, in turn, a divisional of our then copending application Ser. No. 330,847, filed Dec. 15, 1981, now abandoned.

This invention relates to emulsifiers for emulsion polymerization.

Resin acid soaps, fatty acid soaps, etc. are known as emulsifiers for preparing styrene-butadiene rubber, isoprene rubber, butadiene rubber, chloroprene rubber and ABS resin by emulsion polymerization. Of these known emulsifiers, the resin acid soaps, such as soaps of disproportionated rosin and hydrogenated rosin, are more outstanding than the other emulsifiers in tackifying effect, imparting better tackiness and processability to the resulting synthetic rubbers and synthetic resins. Further since these emulsifiers are more soluble at low temperatures and usable for polymerization at low temperatures, they given very satisfactory characteristics to the rubbers and resins prepared. Thus they are evaluated as the most excellent emulsifiers. However, there are inherent limitations on the supply of rosin which is a natural product because of limited resources.

An object of the present invention is to provide a synthetic emulsifier which is usable as a substitute for conventional resin acid soaps.

Another object of the invention is to provide a synthetic emulsifier which is more effective than the resin acid soaps in promoting emulsion polymerization reactions.

Another object of the invention is to provide a synthetic emulsifier which is capable of effecting polymerization within an exceedingly shorter period of time than the resin acid soaps.

Another object of the invention is to provide a synthetic emulsifier which is effectively usable in much smaller amounts than the resin acid soaps.

These objects and other features of the invention will become apparent from the following description.

The above objects can be fulfilled by using a half amide alkali salt of a succinic acid having a hydrocarbon group with 8 to 30 carbon atoms and/or a half ester alkali salt of the acid as the active component of emulsifiers for emulsion polymerization.

We have conducted extensive research in order to provide emulsifiers for emulsion polymerization which can be chemically synthesized from easily available materials and which have outstanding characteristics for use as substitutes for the resin acid soaps, and found that half amide alkali salts or half ester alkali salts of succinic acids having the above-mentioned hydrocarbon group are useful for fulfilling this object. We have further found that these compounds are much more effective than known emulsifiers, especially the resin acid soaps, in promoting polymerization and effecting polymerization within shortened periods of time. In fact, FIG. 1 shows that the emulsifier of the invention, when used, achieves the desired conversion within 50 to 60% of the time needed for salts of disproportionated rosin.

Additionally the emulsifiers of the invention, like the resin acid soaps, are highly soluble at low temperatures, are satisfactorily usable as emulsifiers for polymerization at low temperatures, impart remarkably improved stability to the latexes formed and give suitable tackiness and processability to the resulting rubbers and resins without adversely affecting the properties of such products.

These effects are peculiar to the emulsifier of this invention which contains as its active component a half amide alkali salt or half ester alkali salt of the above-specified substituted succinic acid. Although it is known to use an alkali salt of substituted succinic acid as an auxiliary dispersant in combination with a resin acid soap, fatty acid soap or the like serving as an emulsifier for emulsion polymerization (Published Unexamined Japanese Patent Application No. 86783/1978), the alkali salt, when singly used for emulsion polymerization, in no way produces a satisfactory effect and fails to promote the polymerization reaction. When tested under the same conditions as will be described later, the conversion achieved by the alkali salt is as low as less than 50% of the conversion effected by the resin acid soap.

The half amide alkali salts of succinic acids having a hydrocarbon substituent with 8 to 30 carbon atoms which are useful as active components of the emulsifiers of the invention are represented by the formula (I)

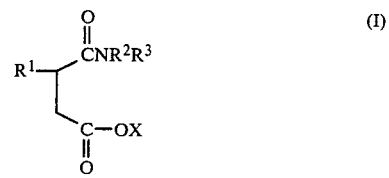

wherein $R^1$ is a hydrocarbon group having 8 to 30 carbon atoms, $R^2$ and $R^3$ are each a hydrogen atom or an alkyl group having 1 to 4 carbon atoms, or $R^2$ and $R^3$, when taken together, form a 5- or 6-membered heterocyclic ring along with the nitrogen atom to which they are attached, and X is an alkali metal atom or a substituted or unsubstituted ammonium group.

Examples of preferred hydrocarbon groups represented by $R^1$ in the formula (I) and having 8 to 30 carbon atoms are straight-chain or branched-chain alkenyl or alkyl groups, more preferably those having 10 to 25 carbon atoms, such as octenyl, nonenyl, nonyl, decenyl, dodecenyl, dodecyl, tetradecenyl, pentadecenyl, hexadecenyl, octadecenyl, octadecyl, eicosenyl, etc. When the hydrocarbon group has less than 8 carbon atoms, the salt has low micelle-forming ability, whereas if the group has more than 30 carbon atoms, the salt has poor solubility in water. In either case, the salt will have reduced emulsifying ability.

Examples of alkyl groups represented by $R^2$ and $R^3$ and having 1 to 4 carbon atoms are straight-chain or branched-chain alkyl groups, such as methyl, ethyl, propyl, isopropyl, butyl, etc. Examples of heterocyclic rings that can be formed by $R^2$ and $R^3$ along with the nitrogen atom to which they are attached are pyrrolidino, piperidino, piperazino, morpholino, etc.

Of the compounds represented by the formula (I), those in which at least one of $R^2$ and $R^3$ is hydrogen tend to change into imide compounds when the emulsifier is stored for a prolonged period of time, so that when the emulsifier is to be preserved for a long period of time, compounds are preferable in which neither of $R^2$ and $R^3$ is hydrogen.

The alkali salt useful as the active component of the present emulsifier is prepared commercially in the following manner, for example, from an equimolar addition product of an olefin having a specified number of carbon atoms and maleic anhydride (alkenyl succinic anhydride) or this product as hydrogenated (alkyl succinic anhydride). The starting material is reacted with ammonia, a primary amine or secondary amine to obtain a half amide in equimolar proportions, which is further neutralized with ammonia or an amine to prepare an ammonium salt. Alternatively the half amide is neutralized with potassium hydroxide, sodium hydroxide or like alkali metal hydroxide to prepare an alkali metal salt. In the above process, olefin is reacted with maleic anhydride under conditions usually used, for example, at a temperature of 150° to 280° C. for about 30 minutes to 10 hours as contained in an open or closed reactor. For hydrogenation, the addition product is reacted under conditions usually empolyed. The reaction for obtaining the half amide is conducted at −30° to 150° C., preferably at about 0° to about 50° C. for 10 minutes to 3 hours. The salt can be prepared also under usual conditions, e.g. at about 0° to 80° C.

Examples of olefins useful for the above process are those readily available for commercial operation, such as oligomers of lower olefins including ethylene, propylene, butene, isobutene, pentene, isopentene, hexene, etc. Further a wide variety of primary amines and secondary amines are usable for the above process. Typical of such amines are primary amines including methylamine, ethylamine, propylamine and butylamine, and secondary amines including dimethylamine, diethylamine, methylethylamine, dipropylamine, morpholine, piperidine, piperazine and pyrrolidine.

The half ester alkali salts of succinic acids having a hydrocarbon substituent with 8 to 30 carbon atoms and useful as active components of the other type according to the invention are represented by the formula (II)

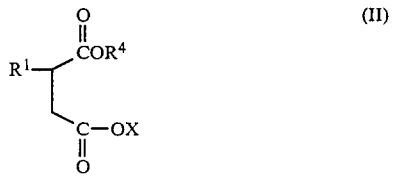

(II)

wherein $R^1$ and X are as defined above, and $R^4$ is a straight-chain or branched-chain alkyl group having 1 to 8 carbon atoms.

Such alkali salts are prepared from the aforementioned alkyl or alkenyl succinic ahydride, for example, by reacting a straight-chain or branched-chain alkanol having 1 to 8 carbon atoms with the anhydride and neutralizing the product. Examples of useful alkanols are methyl alcohol, ethyl alcohol, propyl alcohol, isopropyl alcohol, butyl alcohol, amyl alcohol, hexyl alcohol, cyclohexyl alcohol, octyl alcohol, 2-ethylhexyl alcohol, etc. The reaction between the alkanol and the anhydride is conducted under usual conditions, for example, at a temperature of 0° to 150° C., preferably at about 20° to about 100° C., for about 30 minutes to about 10 hours.

The emulsifiers of this invention are useful for emulsion polymerization for preparing various synthetic rubbers and synthetic resins, such as polystyrene, styrene-butadiene rubber, polyisoprene rubber, acrylonitrile-butadiene-styrene resin, methyl methacrylatebutadiene rubber, polybutadiene rubber, etc. Being more soluble at low temperatures, the emulsifiers are usable as they are for usual emulsion polymerization processes at low temperatures as well as at high temperatures. Examples of polymerizable monomers for the preparation of synthetic rubbers and resins by emulsion polymerization are acrylates, methacrylates, styrene, vinyl chloride, butadiene, chloroprene, isoprene, etc.

The emulsifiers of this invention are used for such polymerization reaction in an amount usually of 0.5 to 10% by weight, preferably 1 to 5% by weight, based on the monomer. The amount required is much smaller than is the case with the conventional resin acid soaps.

The emulsifiers of the invention can be used in combination with other known emulsifiers although they exhibit outstanding effects when singly used as already stated.

The invention will be described with reference to the following examples, in which all the percentages are by weight unless otherwise specified.

EXAMPLE 1

A butylene oligomer (mixture containing 46% of $C_{12}$ olefin, 15% of $C_{15}$ olefin and 15% of $C_{16}$ olefin) and maleic anhydride are subjected to addition reaction to obtain a substituted succinic acid anhydride (saponification value: 400), which is reacted with a saponification equivalent of dimethylamine (50% aqueous solution) at 10° to 20° C. for 1 hour, whereby dimethylamine salt of substituted succinic acid half amide is prepared. The salt will be referred to as "Emulsifier A".

EXAMPLE 2

The substituted succinic anhydride of Example 1 is dissolved in benzene, and ammonia gas is blown into the solution for 1 hour while maintaining the solution at 20° to 25° C. The resulting precipitate is dried to obtain ammonium salt of substituted succinic acid half amide (hereinafter referred to as "Emulsifier B").

EXAMPLE 3

The substituted succinic acid anhydride of Example 1 is dissolved in 0.6 saponification equivalent of ethyl alcohol, and the solution is heated for reaction at the boiling point of ethyl alcohol for 1 hour. The ethyl alcohol is distilled off from the reaction mixture in a vacuum to obtain half ethyl ester of substituted succinic acid (acid value: 175), which is neutralized with a neutralization equivalent of potassium hydroxide, giving potassium salt of the half ester (hereinafter referred to as "Emulsifier C").

EXAMPLE 4

A propylene oligomer (containing 76% of $C_{12}$ olefin and 17% of $C_{11}$ olefin in mixture) and maleic anhydride are subjected to addition reaction to obtain a substituted succinic anhydride (saponification value: 420), which is reacted with 0.5 saponification equivalent of diethylamine at 20° to 25° C. to prepare a substituted succinic acid half amide having an acid value of 170. The half amide is neutralized with a neutralization equivalent of potassium hydroxide, giving potassium salt of the half amide (hereinafter referred to as "Emulsifier D").

EXAMPLE 5

The substituted succinic acid anhydride of Example 4 and 0.6 equivalent of methyl alcohol are reacted at the boiling point of methyl alcohol for 2 hours. The methyl alcohol is distilled off from the reaction mixture in a vacuum to obtain half methyl ester of substituted succinic acid (acid value: 190), which is neutralized with a neutralization equivalent of potassium hydroxide, giving potassium salt of the half ester (hereinafter referred to as "Emulsifier E").

EXAMPLE 6

A butylene oligomer (containing 15% of $C_{11-12}$ olefin, 19% of $C_{13-14}$ olefin, 62% of $C_{15-16}$ olefin and 4% of $C_{17-18}$ olefin in mixture) and maleic anhydride are subjected to addition reaction to obtain a succinic acid anhydride (saponification value: 351), which is reacted with 0.5 saponification equivalent of dimethylamine at 10° to 20° C. to prepare a substituted succinic acid half amide having an acid value of 186. The half amide is neutralized with a neutralization equivalent of potassium hydroxide, affording potassium salt of the half amide (hereinafter referred to an "Emulsifier F").

EXAMPLE 7

A butylene oligomer (containing 9% of $C_{15-16}$ olefin, 16% of $C_{17-18}$ olefin, 53% of $C_{19-20}$ olefin, 11% of $C_{21-22}$ olefin and 11% of $C_{23-24}$ olefin in mixture) and maleic anhydride are subjected to addition reaction to obtain a succinic acid anhydride (saponification value: 263), which is reacted with dimethylamine in the same manner as in Example 6 to obtain a substituted succinic acid half amide having an acid value of 135. The amide is neutralized with a neutralization equivalent of sodium hydroxide, giving sodium salt of the half amide (hereinafter referred to as "Emulsifier G").

EXAMPLE 8

The substituted succinic acid anhydride of Example 1 is hydrogenated, and the product (saponification value: 397) is reacted with 0.5 saponification equivalent of n-butylamine at 20° to 25° C. for 1 hour to obtain a half amide of alkylsuccinic acid having an acid value of 165. The half amide is neutralized with a neutralization equivalent of potassium hydroxide to prepare potassium salt of the half amide (Emulsifier H).

COMPARISON EXAMPLE 1

Potassium salt of commercial disproportionated rosin will be referred to as "Emulsifier a".

COMPARISON EXAMPLE 2

The substituted succinic acid anhydride of Example 1 is neutralized with a saponification equivalent of an aqueous solution of potassium hydroxide to obtain dipotassium salt of the substituted succinic acid (hereinafter referred to as "Emulsifier b").

COMPARISON EXAMPLE 3

The substituted succinic acid anhydride of Example 4 is neutralized in the same manner as in Comparison Example 2 to obtain dipotassium salt of the substituted succinic acid (hereinafter referred to as "Emulsifier c").

Emulsion polymerization test

Each of Emulsifiers A and H and a to c is used for emulsion polymerization to prepare SBR, typical of synthetic rubbers, by the cold rubber process according to sulfoxylate recipe. The conversion of the SBR obtained is determined.

1. Materials and agents used
   As listed in Table 1 below.

TABLE 1

| Materials and agents | | Proportions (parts by wt.) |
|---|---|---|
| Monomer | Butadiene | 70 |
|  | Styrene | 30 |
| Dispersing medium | Deionized water (deaerated) | 200 |
| Emulsifier | One of Emulsifiers A–H, a–c | 4 |
| Dispersant | Sodium sulfonate of naphthalene formaldehyde resin | 0.15 |
| Chain transfer agent | Tertiary dodecylmercaptan | 0.245 |
| Polymerization initiator | | |
| Oxidizing agent | p-Methanehydroperoxide | 0.104 |
| Reducing agent | Ferrous sulfate (heptahydrate) | 0.05 |
| Secondary reducing agent | Sodium formaldehyde sulfoxylate | 0.15 |
| Chelating agent | EDTA—4Na | 0.07 |
| Electrolyte | Sodium phosphate (dodecahydrate) | 0.8 |

2. Polymerization conditions
   Temperature: 5° C.
   Time: 6 hours
   In nitrogen gas atmosphere
3. Conversion
   Listed in Table 2.
4. Latex stability The whole amount of the latex obtained by polymerization is placed into a three-necked 500-ml flask, and steam is blown into the flask to evaporate off the unreacted butadiene and styrene. The coagulation separated out is filtered off with a 80-mesh stainless steel screen and is combined with the coagulation produced during polymerization. The combined coagulation is dried. The ratio of formation of the coagulation is calculated from the following equation to evaluate the stability of the latex. The smaller the value, the better is the stability.

Coagulation formation ratio (%) =

$$\frac{\text{Dry weight of whole coagulation (g)}}{\text{Dry weight of whole rubber (g)}} \times 100$$

Table 2 shows the results

TABLE 2

| Test No. | Emulsifier | Conversion | Coagulation formation ratio (%) |
|---|---|---|---|
| 1 | A | 81.3 | 0.3 |
| 2 | B | 74.1 | 0.4 |
| 3 | C | 68.0 | 0.4 |
| 4 | D | 72.8 | 0.4 |
| 5 | E | 70.0 | 0.5 |
| 6 | F | 73.3 | 0.3 |
| 7 | G | 71.5 | 0.7 |
| 8 | H | 79.0 | 0.3 |
| 9 | a | 60.0 | 0.9 |
| 10 | b | 27.2 | 0.4 |
| 11 | c | 25.4 | 0.5 |

Each of Emulsifiers A, C and a is further tested in the same manner as above except that the reaction is conducted for 3 hours or 4.5 hours to determine the conversion achieved. FIG. 1 shows the results along with the results listed in Table 2 above. FIG. 1 shows that the emulsifiers of the invention are more effective in promoting polymerization (in shortening the polymerization time) than the alkali salt of disproportionated rosin which is known to be one of the most excellent emulsifiers heretofore available.

EXAMPLE 9

The substituted succinic acid anhydride of Example 1 is reacted with 0.5 saponification equivalent of dimethylamine (50% aqueous solution) at 5° to 10° C. for 1 hour to obtain a half amide of the substituted succinic acid having an acid value of 181. The half amide is neutralized with a neutralization equivalent of potassium hydroxide to obtain potassium salt of the half amide (hereinafter referred to as "Emulsifier I").

Emulsifier I is tested for emulsion polymerization in the same manner as above except that 2 parts by weight of the emulsifier is used. The test results in a conversion of 61.0% and a coagulation formation ratio of 0.5% (Test No. 12).

Evaluation of rubber

The following composition is prepared according to JIS K 6383 with use of each of the rubber obtained in Test No. 9, the rubber of Test No. 12 and commercial SBR 1500. The composition is mixed with use of rolls, 18 inches in length and 8 inches in diameter, according to ASTM D 3185-75 to obtain a compound.

The mixing procedure is:
Speed of rotation of front roll: 18 r.p.m.
Front-to-rear roll speed ratio: 1:1.25
Mill roll temperature: 50±5° C.

| Composition | |
|---|---|
| SBR | 100 parts by wt. |
| Stearic acid | 1 |
| Zinc oxide | 3 |
| Accelerator (cyclohexyl-benzothiazole sulfenamide) | 1 |
| Sulfur | 1.75 |
| Carbon black (HAF) | 50 |

The properties of the rubbers are shown below. The results indicate that the rubber obtained with use of 2 parts of the present emulsifier has satisfactory properties and is comparable to the rubber obtained with use of 4 parts of the commercial disproportionated rosin and the commercial SBR.

TABLE 3

| Rubber | No. 9 | No. 12 | SBR (commercial) |
|---|---|---|---|
| Mooney viscosity ($ML_{1+4}$:100 ± 1° C.) | 94 | 86 | 85 |
| Mooney scorch* | | | |
| Min. viscosity | 64 | 62 | 59 |
| Min. viscosity time | 27°30$^m$ | 17°45$^m$ | 28°00$^m$ |
| t5 | 45°30$^m$ | 27°50$^m$ | 48°45$^m$ |
| t35 | 62°45$^m$ | 32°40$^m$ | 63°20$^m$ |

*Large rotor, preheating for 1 min. at 125 ± 1° C.
Test method: Mooney, JIS K6300-1974

TABLE 4

| Rubber | No. 9 | No. 12 | SBR |
|---|---|---|---|
| Curing time (145 ± 1° C., min) | 45 | 20 | 45 |
| Unaged | | | |
| Tensile strength, kgf/cm$^2$ | 276 | 287 | 290 |
| Elongation, % | 470 | 500 | 490 |
| Hardness, Hs (JIS A) | 70 | 69 | 68 |
| 300% modulus, kgf/cm$^2$ | 176 | 160 | 161 |
| Tear resistance, kgf/cm | 48 | 45 | 53 |
| Aged (gear oven method, 70 ± 1° C. × 96 hrs) | | | |
| Tensile strength percentage change, % | +7.8 | −1.0 | +0.2 |
| Elongation percentage change, % | −26.2 | −27.8 | −26.3 |
| Hardness change, Hs (JIS A) | +3 | +8 | +3 |
| 300% modulus percentage change, % | +47.4 | +43.8 | +42.1 |

Curing temperature: 145 ± 1° C.
Test method: JIS K6301-1973

We claim:

1. In a process of addition polymerization of a polymerizable monomer for preparing synthetic rubbers or synthetic resins by emulsion polymerization, an improvement characterized in that an emulsifier containing as its active component at least one member from the group consisting of a half amide alkali salt of a succinic acid of the formula

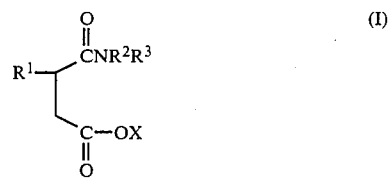

wherein $R^1$ is a hydrocarbon group having 8 to 30 carbon atoms, $R^2$ and $R^3$ are each a hydrogen atom or an alkyl group having 1 to 4 carbon atoms, or $R^2$ and $R^3$, when taken together, form a 5- or 6-membered heterocyclic ring along with the nitrogen atom to which they are attached, and X is an alkali metal atom or a substituted or unsubstituted ammonium group, and a half ester alkali salt of a succinic acid of the formula

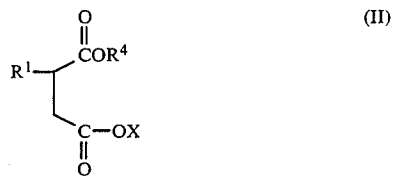

wherein $R^1$ and X are as defined above, and $R^4$ is a straight-chain or branched-chain alkyl group having 1 to 8 carbon atoms is used for emulsifying the polymerizable monomers.

2. In a process of addition polymerization as claimed in claim 1 wherein the half amide alkali salt is represented by the formula

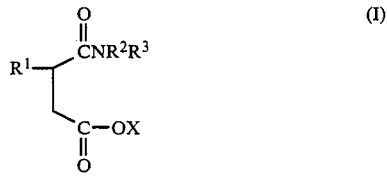

wherein $R^1$ is a hydrocarbon group having 8 to 30 carbon atoms, $R^2$ and $R^3$ are each a member selected from the group consisting of a hydrogen atom and an alkyl group having 1 to 4 carbon atoms, or $R^2$ and $R^3$, when taken together, form a 5- or 6-membered heterocyclic ring along with the nitrogen atom to which they are attached, and X is a member selected from the group consisting of an alkali metal atom, a substituted ammonium group and an unsubstituted ammonium group.

3. In a process of addition polymerization as claimed in claim 1 wherein the half ester alkali salt is represented by the formula

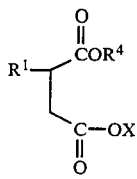 (II)

and wherein $R^4$ is a member from the group consisting of a straight-chain and a branched-chain alkyl group having 1 to 8 carbon atoms.

4. In a process of addition polymerization as claimed in claim 2 wherein $R^1$ is one of straight chain and a branched chain hydrocarbon group having 10 to 25 carbon atoms.

5. In a process of addition polymerization of a polymerizable monomer for preparing synthetic rubbers or synthetic resins by emulsion polymerization, an improvement characterized in that an emulsifier containing as its active component a half amide alkali salt of a succinic acid of the formula

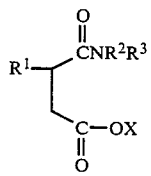 (I)

wherein $R^1$ is a hydrocarbon group having 8 to 30 carbon atoms, $R^2$ and $R^3$ are each one of the group consisting of a hydrogen atom and an alkyl group having 1 to 4 carbon atoms, or $R^2$ and $R^3$, when taken together, form a 5- or 6-membered heterocyclic ring along with the nitrogen atom to which they are attached, and X is at least one member selected from the group consisting of an alkali metal atom, a substituted ammonium group, and unsubstituted ammonium group, and a half ester alkali salt of a succinic acid of the formula

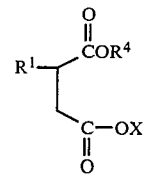 (II)

wherein $R^1$ and X are as defined above, and $R^4$ is a straight-chain or branched-chain alkyl group having 1 to 8 carbon atoms is used for emulsifying the polymerizable monomers.

6. In a process of addition polymerization as claimed in claim 5 wherein the half amide alkali salt is represented by the formula

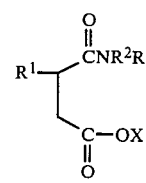 (I)

wherein $R^1$ is a hydrocarbon group having 8 to 30 carbon atoms, $R^2$ and $R^3$ are each a member selected from the group consisting of a hydrogen atom and an alkyl group having 1 to 4 carbon atoms, or $R^2$ and $R^3$, when taken together, form a 5- or 6-membered heterocyclic ring along with the nitrogen atom to which they are attached, and X is a member selected from the group consisting of an alkali metal atom, a substituted ammonium group and an unsubstituted ammonium group.

7. In a process of addition polymerization as claimed in claim 5 wherein the half ester alkali salt is represented by the formula

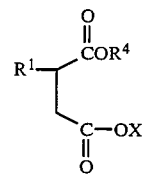 (II)

and wherein $R^4$ is a member from the group consisting of a straight-chain and a branched-chain alkyl group having 1 to 8 carbon atoms.

8. In a process of addition polymerization as claimed in claim 6 wherein $R^1$ is one of straight chain and a branched chain hydrocarbon group having 10 to 25 carbon atoms.

* * * * *